United States Patent
Bae et al.

(10) Patent No.: US 9,307,010 B2
(45) Date of Patent: Apr. 5, 2016

(54) DATA UPLOAD METHOD USING SHORTCUT

(75) Inventors: Hyo-Hwan Bae, Gwangju (KR);
Sin-Jong Li, Gwangju (KR)

(73) Assignee: ENBSOFT INC. (KR)

( * ) Notice: Subject to any disclaimer, the term of this patent is extended or adjusted under 35 U.S.C. 154(b) by 312 days.

(21) Appl. No.: 13/696,409

(22) PCT Filed: Sep. 13, 2010

(86) PCT No.: PCT/KR2010/006202
§ 371 (c)(1),
(2), (4) Date: Nov. 6, 2012

(87) PCT Pub. No.: WO2011/152593
PCT Pub. Date: Dec. 8, 2011

(65) Prior Publication Data
US 2013/0054760 A1    Feb. 28, 2013

(30) Foreign Application Priority Data

May 31, 2010  (KR) .................. 10-2010-0051135
Jul. 1, 2010    (KR) .................. 10-2010-0063465

(51) Int. Cl.
| | |
|---|---|
| G06F 15/16 | (2006.01) |
| H04L 29/06 | (2006.01) |
| G06F 21/00 | (2013.01) |
| G06F 3/048 | (2013.01) |
| G06F 17/30 | (2006.01) |
| H04L 29/08 | (2006.01) |

(52) U.S. Cl.
CPC ..................... *H04L 67/06* (2013.01)

(58) Field of Classification Search
CPC ................. G06F 9/4411; G06F 8/61
USPC ........................................... 709/219
See application file for complete search history.

(56) References Cited

U.S. PATENT DOCUMENTS

| | | | |
|---|---|---|---|
| 7,885,925 B1* | 2/2011 | Strong et al. ................ 707/620 |
| 8,595,186 B1* | 11/2013 | Mandyam .............. G06F 8/38 |
| | | | 707/632 |
| 2002/0135617 A1* | 9/2002 | Samid ...................... 345/764 |
| 2003/0023956 A1* | 1/2003 | Dulberg et al. ............ 717/130 |
| 2003/0204631 A1 | 10/2003 | Pinkerton et al. |
| 2004/0030741 A1* | 2/2004 | Wolton ............ G06F 17/30873 |
| | | | 709/202 |

(Continued)

FOREIGN PATENT DOCUMENTS

| | | |
|---|---|---|
| CN | 1553361 | 12/2004 |
| CN | 101055576 | 10/2007 |
| CN | 101170507 | 4/2008 |

OTHER PUBLICATIONS

OA issued on Aug. 4, 2014 in corresponding Chinese application No. 201080066791.8.

*Primary Examiner* — Kevin Bates
*Assistant Examiner* — Mark A Scott
(74) *Attorney, Agent, or Firm* — Onello & Mello, LLP (57) ABSTRACT

Provided is a method of uploading data to a data server with minimum manipulations and downloading or retrieving the uploaded data by using a user's mobile terminal or a user-designated recipient's mobile terminal. A data upload method used by a computer system includes: monitoring whether a data upload shortcut command is input; selecting an object to be uploaded when an input of the data upload shortcut command is sensed; and transmitting an upload file, which consists of data of the selected object, to a data server.

10 Claims, 5 Drawing Sheets

(56) References Cited

U.S. PATENT DOCUMENTS

| | | | |
|---|---|---|---|
| 2004/0236945 A1* | 11/2004 | Risan | G06F 21/10 713/165 |
| 2005/0192837 A1 | 9/2005 | Fears et al. | |
| 2005/0198220 A1* | 9/2005 | Wada | G06F 17/30899 709/220 |
| 2005/0286497 A1* | 12/2005 | Zutaut et al. | 370/352 |
| 2007/0038610 A1* | 2/2007 | Omoigui | 707/3 |
| 2007/0106795 A1* | 5/2007 | Gilfix et al. | 709/226 |
| 2007/0150888 A1* | 6/2007 | Shapiro | G06F 8/61 717/174 |
| 2007/0190978 A1* | 8/2007 | White et al. | 455/412.1 |
| 2007/0276911 A1* | 11/2007 | Bhumkar et al. | 709/206 |
| 2007/0283048 A1* | 12/2007 | Theimer et al. | 709/246 |
| 2007/0283425 A1* | 12/2007 | Ture | G06F 17/30864 726/5 |
| 2008/0189439 A1* | 8/2008 | Chitre et al. | 709/248 |
| 2008/0235339 A1 | 9/2008 | Lurey et al. | |
| 2008/0301180 A1 | 12/2008 | Klassen et al. | |
| 2009/0043907 A1* | 2/2009 | Peterson | G06F 3/0236 709/231 |
| 2009/0132969 A1* | 5/2009 | Mayer | G06F 17/30587 715/862 |
| 2009/0204964 A1* | 8/2009 | Foley | G06F 21/53 718/1 |
| 2009/0248695 A1* | 10/2009 | Ozzie et al. | 707/10 |
| 2009/0292681 A1* | 11/2009 | Wood | G06F 17/30864 |
| 2010/0070448 A1* | 3/2010 | Omoigui | H01L 27/1463 706/47 |
| 2010/0076818 A1* | 3/2010 | Peterson | G06Q 30/0245 705/59 |
| 2010/0211934 A1* | 8/2010 | Simons | G06F 8/60 717/126 |
| 2011/0015996 A1* | 1/2011 | Kassoway et al. | 705/14.49 |
| 2011/0258301 A1* | 10/2011 | McCormick et al. | 709/222 |
| 2011/0286586 A1* | 11/2011 | Saylor et al. | 379/88.13 |
| 2011/0294547 A1* | 12/2011 | Ni | 455/557 |
| 2012/0005311 A1* | 1/2012 | Livingston et al. | 709/219 |
| 2013/0132854 A1* | 5/2013 | Raleigh et al. | 715/738 |

* cited by examiner

DATA UPLOAD METHOD USING SHORTCUT

TECHNICAL FIELD

The following description relates to a data upload method using a shortcut key or a pop-up menu, and more particularly, to a method of uploading data to a data server with minimum manipulations and downloading or retrieving the uploaded data by using a user's mobile terminal or a user-designated recipient's mobile terminal.

BACKGROUND ART

The so-called Internet storage service involves giving a user an account to access a data server through the Internet and allowing the user given the account to use a storage service through the Internet.

As the use of mobile terminals (e.g., smart phones) that can access the Internet anywhere increases, the need for retrieving data uploaded from a computer system to a data server by using a mobile terminal is also increasing.

DISCLOSURE OF INVENTION

Technical Problem

To upload data stored in a computer system to a data server, an application for accessing the data server is executed, and data is uploaded to the data server by using the application. In this method, however, since a certain application must be executed, a lot of manipulations are required.

In addition, the type of contents that can be used on mobile terminals may be limited as compared with computer systems. For example, a moving image in an 'asf' format cannot be played on certain mobile terminals. Thus, even when the moving image in the 'asf' format is downloaded from a data server to the mobile terminals, it cannot be immediately played on the mobile terminals. Accordingly, this has led to a demand for a technology of uploading various contents stored in a computer system to a data server with minimum manipulations but converting a file that is to be uploaded (hereinafter, referred to as an 'upload file') into a format supported by a recipient's mobile terminal and uploading the upload file in the supported format to the data server.

In computers, data is managed on a file-by-file basis. Likewise, there is a demand for a technology of converting contents displayed on a web browser application, a document editing application, or other viewer applications into a file with minimum manipulations, uploading the file to a data server, and downloading the uploaded file to a mobile terminal.

Solution to Problem

The following description relates to a method of uploading data to a data server only with the input of a shortcut command to upload data (hereinafter, referred to as a 'data upload shortcut command') without executing an application, which is required to upload data to the data server, and downloading or retrieving the uploaded data by using a user s mobile terminal or a user-designated recipient's mobile terminal.

The following description also relates to a method of identifying a model of a recipient's mobile terminal, converting an upload file into a format supported by the recipient's mobile terminal when the upload file is in a format unsupported by the recipient's mobile terminal, and uploading the upload file in the supported format to a data server.

The following description also relates to a method of converting contents displayed on a certain application into a file and uploading the file to a data server.

In one general aspect, there is provided a data upload method used by a computer system. The method includes: monitoring whether a data upload shortcut command is input; selecting an object to be uploaded when an input of the data upload shortcut command is sensed; and transmitting an upload file, which consists of data of the selected object, to a data server. The data upload shortcut command may be input by inputting a shortcut key or selecting a menu item from a pop-up menu that appears upon a right mouse button click. That is, an agent application may perform the function of monitoring whether the data upload shortcut command is input.

The monitoring of whether the data upload shortcut command is input, the selecting of the object to be uploaded, and the transmitting of the upload file may be performed by the agent application which is executed in a background mode by an operating system that controls the computer system. Here, the method may further include receiving information about a model of a mobile terminal through the agent application, wherein the transmitting of the upload file may include: retrieving information about formats supported and unsupported by the model of the mobile terminal; and converting the upload file into a supported format when the upload file is in an unsupported format and transmitting the upload file in the support format to the data server.

In another aspect, there is provided a data upload method using a shortcut key. The data upload method includes: installing an agent application, which monitors whether a data upload shortcut key is input, on a computer system; selecting an object to be uploaded by using the agent application when the data upload shortcut key is input from a user by using the computer system; and transmitting an upload file, which consists of data of the selected object, to a data server by using the agent application.

In another aspect, there is provided a data upload method using a pop-up menu. The data upload method includes: installing an agent application, which monitors mouse input signals, on a computer system; adding a data upload item to a pop-up menu by using the agent application when a mouse input signal for generating the pop-up menu is received from the computer system; selecting an object to be uploaded by using the agent application when the data upload item is selected; and transmitting an upload file, which consists of data of the selected object, to a data server by using the agent application.

Other features and aspects will be apparent from the following detailed description, the drawings, and the claims.

Advantageous Effects of Invention

According to the present invention, a user of a computer system can upload data to a data server by inputting a data upload shortcut command without executing an application, which is required to upload data, and can download or retrieve the uploaded data to his or her mobile terminal or a user-designated recipient's mobile terminal.

According to the present invention, data in a format unsupported by the mobile terminal of the user having an account in the data server, to which data is to be uploaded, is converted into a supported format and uploaded accordingly to the data server. Thus, the user can download the uploaded data to the mobile terminal and use the downloaded data without conversion.

According to the present invention, after contents displayed on an Internet browser application, a document viewer application, or the like are selected, the input of only the data upload shortcut command is required to convert the selected contents into a file and upload the file to the data server.

Throughout the drawings and the detailed description, unless otherwise described, the same drawing reference numerals will be understood to refer to the same elements, features, and structures. The relative size and depiction of these elements may be exaggerated for clarity, illustration, and convenience.

BEST MODE FOR CARRYING OUT THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to block diagrams or flowchart illustrations of a method of uploading data using a shortcut according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 1:
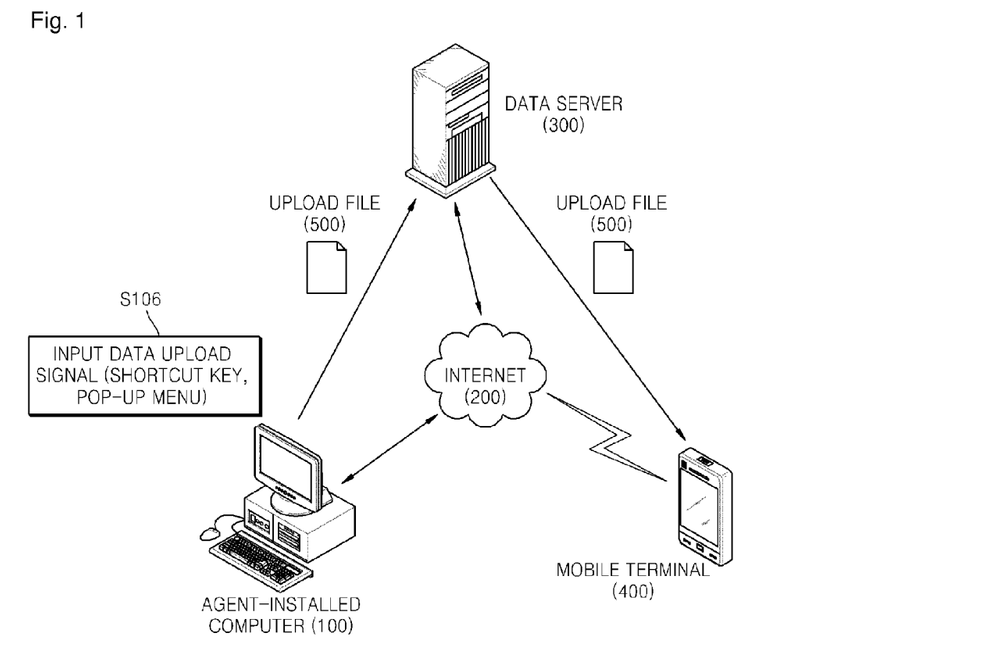
FIG. 1 is a diagram illustrating the configuration of a data upload and retrieval system according to an exemplary embodiment of the present invention.

The configuration of a data upload and retrieval system according to an exemplary embodiment of the present invention will now be described with reference to FIG. 1.

(1) Installation and Execution of an Agent Application

An agent application is a software module that monitors whether a data upload shortcut command is input, selects an object to be uploaded when sensing the input of the data upload shortcut command, creates an upload file 500 which consists of data of the selected object, and transmits the created upload file 500 to a data server 300.

The agent application can be executed on a computer system 100 after an installation file is downloaded to the computer system 100 or after a component object model (COM) module is installed on a website. After installation, the agent application may be executed in the background. That is, the agent application process is performed, but the agent application may not have its own graphic user interface (GUI). Even when the agent application has its own GUI, only environment settings and whether to activate each function can be set on the GUI.

The agent application may be installed such that it automatically runs when the computer system 100 having the agent application installed thereon boots up. In the process of installing the agent application, a user may decide whether to allow the automatic execution of the agent application.

A device on which the agent application is installed, that is, a device on which a data upload method according to the current exemplary embodiment is implemented may be any device capable of transmission control protocol/Internet protocol (TCP/IP) communication. The TCP/IP communication may use a wired communication network or a wireless communication network. For example, the agent application can be installed on personal computers (PCs), personal digital assistants (PDAs), smart phones, and notebooks.

Once installed, the agent application starts monitoring, in the background, whether the data upload shortcut command is input. The data upload shortcut command may be input by inputting a shortcut key or selecting a data upload menu item from a pop-up menu. Thus, the agent application must monitor mouse inputs as well as key inputs. The mouse inputs may include touches on a touch screen or touchpad.

The monitoring of the key inputs and the mouse inputs may be performed by hooking an input occurrence message provided by an operating system installed on the computer system 100 on which the agent application runs. The operating system may support a GUI.

The message hooking may include registering a callback function, which is called when the input occurence message is generated, with a kernel of the operating system; calling the callback function by using the kernel in response to an input signal generated by an input device; determining whether the input signal is related to a data upload function by using the callback function; and executing the data upload function when it is determined that the input signal is related to the data upload function.

(2) Selection of an Object to be Uploaded when a Data Upload Shortcut Command is Input.

When the data upload shortcut command is input (operation S106), the agent application selects an object to be uploaded. The object to be uploaded denotes a data set to be uploaded to the data server 300, such as character strings, image data, moving image data, a file, or a folder.

The agent application may select an object activated on a GUI as the object to be uploaded. When no activated object is available, the agent application may select an object displayed at the position of the cursor on the GUI as the object to be uploaded.

Figure 4:
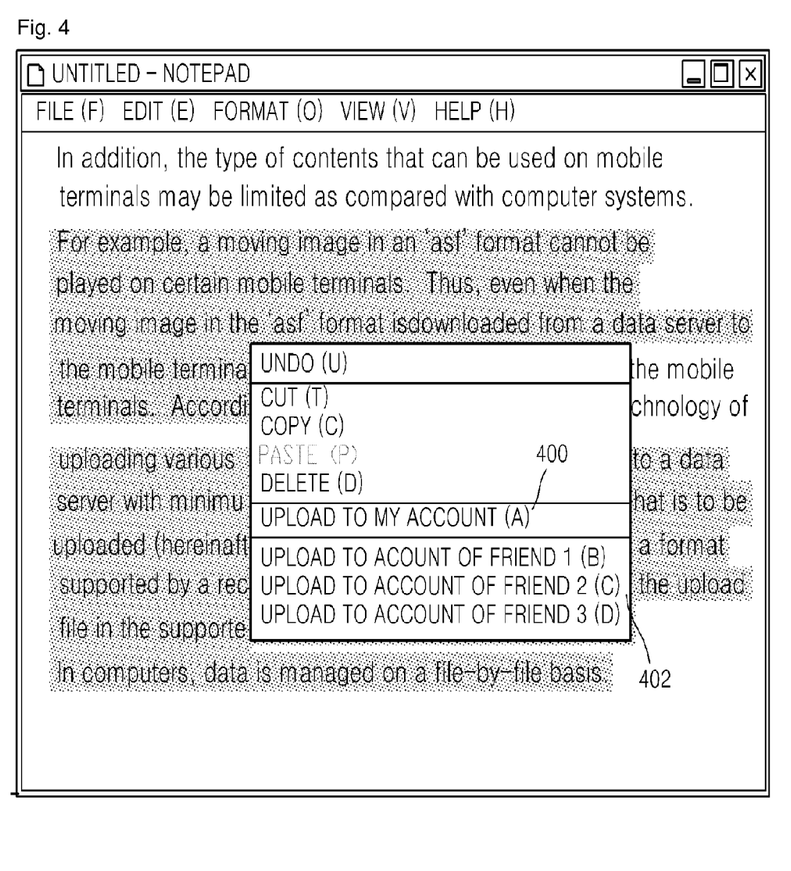
FIG. 4 is a conceptual diagram of a user interface related to a method of uploading character strings posted on a document editing application.

The activated object may be a selected block of text or an object currently selected by a click. FIG. 4 shows a pop-up menu displayed by selecting and activating a block of character strings from all character strings displayed on a document editing program and clicking the right mouse button on the activated block. For example, when a 'upload to My Account' item 400 is selected from menu items of the pop-up menu, the activated block of character strings is selected as the object to be uploaded.

Figure 5:
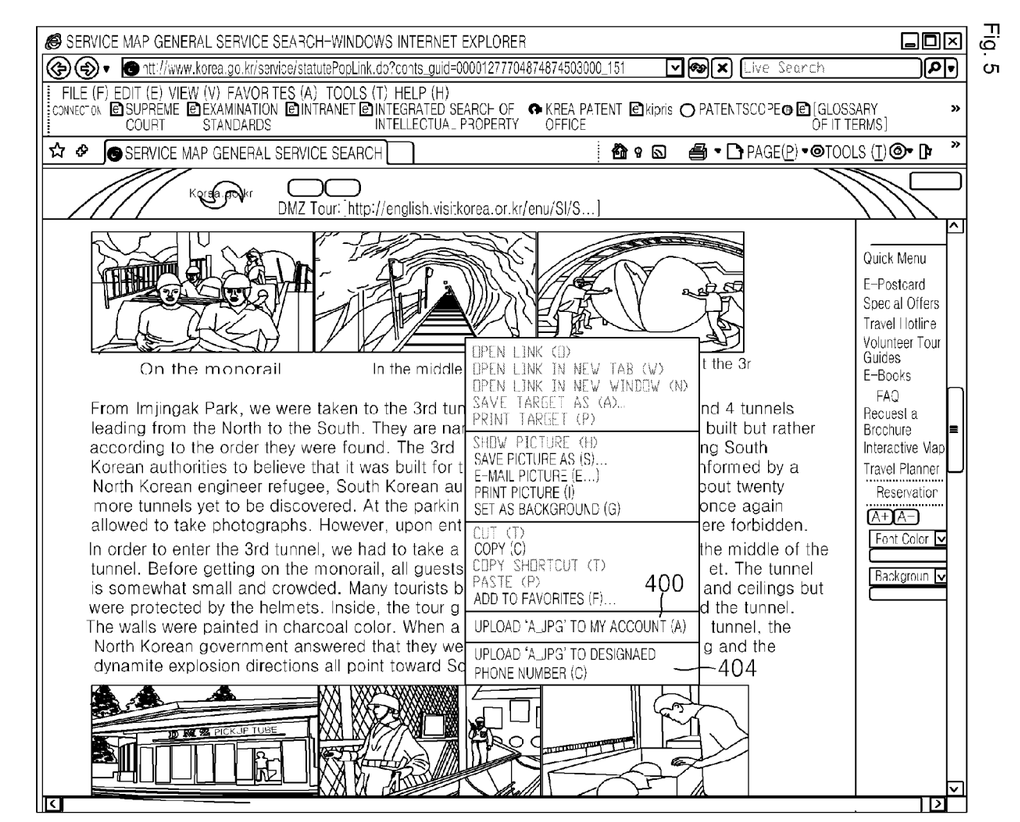
FIG. 5 is a conceptual diagram of a user interface related to a method of uploading an image posted on an Internet browser application according to an exemplary embodiment of the present invention.

FIG. 5 illustrates a case where an object displayed at the position of the cursor on the GUI is selected as the object to be uploaded when no activated object is available. Referring to FIG. 5, when no activated object is available, image data (i.e., an object displayed at the position of the cursor) embedded in a web document may be selected as the object to be uploaded. In this case, the file name of the embedded image data may be written on each data upload menu item 400 or 404 of the pop-up menu, as shown in FIG. 5.

Next, the agent application creates the upload file 500, which consists of data of the selected object to be uploaded, and transmits the created upload file 500 to the data server 300. The above operations of selecting the object to be uploaded, creating the upload file 500, and uploading the upload file 500 may be performed by the agent application in response to only the data upload shortcut command input by the user.

When an object activated or displayed at the position of the cursor is one of a file and a folder, the agent application may upload all files contained in the file or the folder to the data server 300.

When the activated object is character strings as shown in FIG. 4, the agent application may create a document file containing the character strings. The format of the document file is not limited. For example, a general text file (.txt), a word file (.doc) of Microsoft Corporation, or a Hangul file (.hwp) of Hancom Inc. may be created. To create the document file, an application programming interface (API) provided by a document editing application may be used.

As shown in FIG. 5, if the data upload shortcut command is input in a state where an Internet browser application is activated, the object to be uploaded may be at least one of a web document posted on the currently activated Internet browser application and contents embedded in the web document.

The embedded contents may be, e.g., an image, a moving image clip, or a sound clip included in the web document. The type of the object, which is displayed at the position of the cursor and from which URL information is to be extracted, may be obtained from an API provided by the Internet browser application.

Here, the agent application may create a link file containing the URL information and upload the link file to the data server 300.

In addition, the agent application may download a file corresponding to the URL information and upload the downloaded file. For example, when the user places the cursor on an image posted on an Internet browser application and inputs a shortcut key or selects a pop-up menu item to upload the image, the agent application may generate URL information of the image by calling an API provided by the Internet browser application, download a file corresponding to the URL information, and upload the downloaded file to the data server 300.

(3) Format Conversion of an Upload File

When the upload file 500 is in an unsupported format, the agent application may convert the format of the upload file 500 before uploading the upload file 500 to the data server 300.

For example, iPhone models of Apple Inc. are unable to play moving images in an 'asf' format of Microsoft Corporation. Thus, when the upload file 500 is in the 'asf' format, the application agent converts the upload file 500 into an 'mp4' format and uploads the upload file 500 in the mp4 format to the data server 300. Accordingly, the user can download the upload file 500 from the data server 300 using an iPhone and play the downloaded upload file 500 without conversion.

To this end, the operation of obtaining information about the model of a mobile terminal by using the agent application may further be performed. In addition, information about formats supported and unsupported by each mobile terminal model may be stored in the computer system 100 in advance. That is, when the upload file 500 is in an unsupported format, the agent application may convert the upload file 500 into a supported format and transmit the upload file 500 in the support format to the data server 300.

The obtaining of the information about the model of a mobile terminal may include receiving a phone number of a mobile terminal and retrieving information about the model of the mobile terminal by using the phone number of the mobile terminal.

The upload file 500 may be uploaded to the user's own account or to a designated recipient's account. When the upload file 500 is to be uploaded to the user's account, information about the model of the user's mobile terminal 400 may be extracted from subscriber information. When the upload file 500 is to be uploaded to the designated recipient's account, a service ID of the designated recipient or a phone number of the designated recipient's mobile terminal may additionally be input to the computer system 100.

(4) Uploading of Data to a Data Server

The upload file 500 may be stored in a certain area of the data server 300. For example, the upload file 500 may be stored in an area allocated to a first account which is received through the agent application. For example, login information may be received through the agent application, and data may be uploaded to the user's account or to the designated recipient's account.

The upload file 500 can be retrieved or downloaded using the mobile terminal 400 of the user. To this end, a data server access application may be installed on the mobile terminal 400. The mobile terminal 400 may receive information about a second account through the data server access application. When the information about the first account is the same as the information about the second account or when the relationship between the first account and the second account allows the second account to access the first account, a list of files stored in the area allocated to the first account can be provided to the mobile terminal 400. That is, when user A uploads moving image file X to his or her account, user B who has a data sharing relationship with user A can retrieve or download the moving image file X stored in an area allocated to user A's account as well as files stored in an area allocated to his or her account in the data server 300. When user A does not have the data sharing relationship with user B, user A may designate user B as a recipient and upload data to the area of the user B's account.

When the mobile terminal 400 requests transmission of the upload file 500 stored in the area of the first account, the data server 300 may transmit the upload file 500 to the mobile terminal 400.

A method of uploading data to a user's own account will now be described with reference to FIG. 2.

Figure 2:
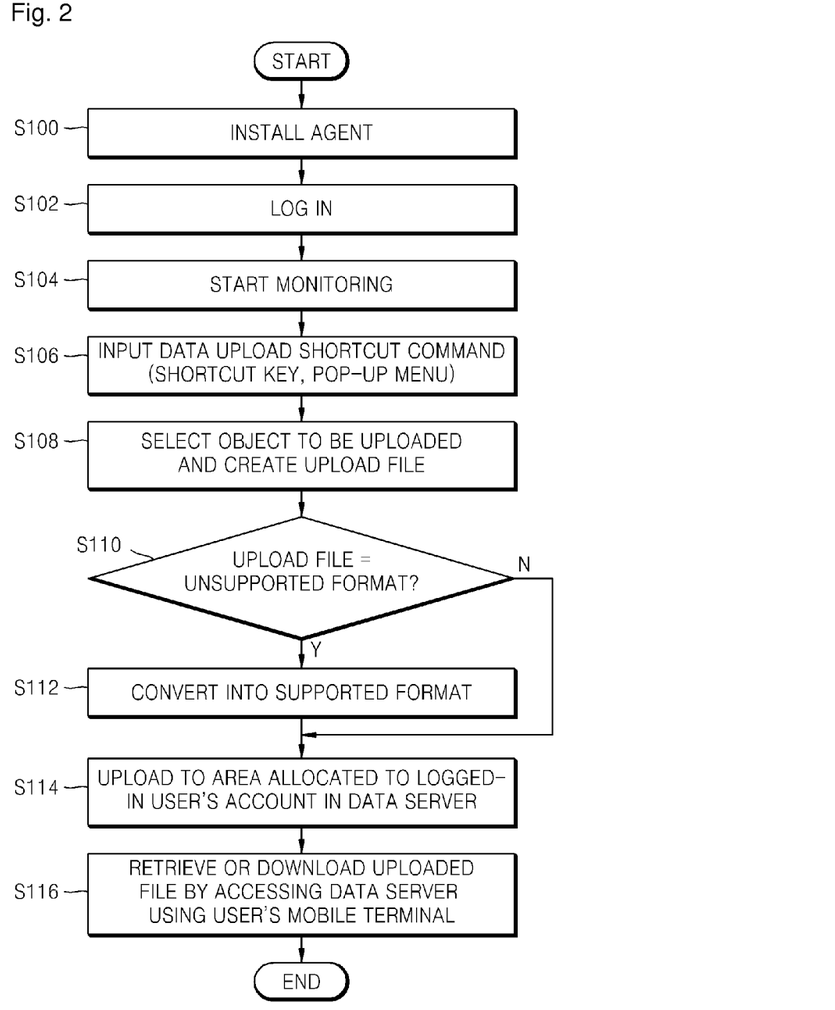
FIG. 2 is a flowchart illustrating a method of uploading data to a user's own account according to an exemplary embodiment of the present invention.

Referring to FIG. 2, an agent application is installed in the way described above (operation S100), and a login process is performed using the agent application (operation S102). Before the login process, a user subscription procedure may be performed. Subscription information may include information about the model of a user's mobile terminal. The information about the model of the user's mobile terminal may be input directly by the user or may be retrieved from a user information server of a communication service provider based on a phone number of the mobile terminal. The user information server of the mobile communication service provider may be, for example, a home location register (HLR) server.

The agent application starts its monitoring operation (operation S104). When sensing the input of a data upload shortcut command (operation 106), the agent application selects an object to be uploaded in the way described above and creates an upload file (operation S108). In the current embodiment, the sensing of the input of the data upload shortcut command (operation S106) denotes sensing the selection of the 'upload to My Account' item 400 from the pop-up menu shown in FIG. 5 or sensing the input of a shortcut key that is allocated to upload data to the user's account.

When the created upload file is in a format unsupported by the model of the mobile terminal of the user who logged in, the agent application converts the upload file into a supported format (operation S112). The conversion may be performed by, e.g., a moving image converter. When the upload file is a document file, it may be converted into a text file (.txt) by extracting only character strings.

The upload file is uploaded to a data server (operation S114). Then, the user can retrieve or download the uploaded upload file by accessing the data server using his or her mobile terminal (operation S116).

According to the present invention, only a single shortcut command input is required for a user to upload a file, a folder, activated character strings, or a selected still or moving image to an area allocated to the user's account in a data server. In addition, when data is in a format unsupported by a mobile terminal of the user, the data is automatically converted into a supported format and is then uploaded to the data server. Thus, after downloading the uploaded data, the user can use the downloaded data without conversion.

Figure 3:
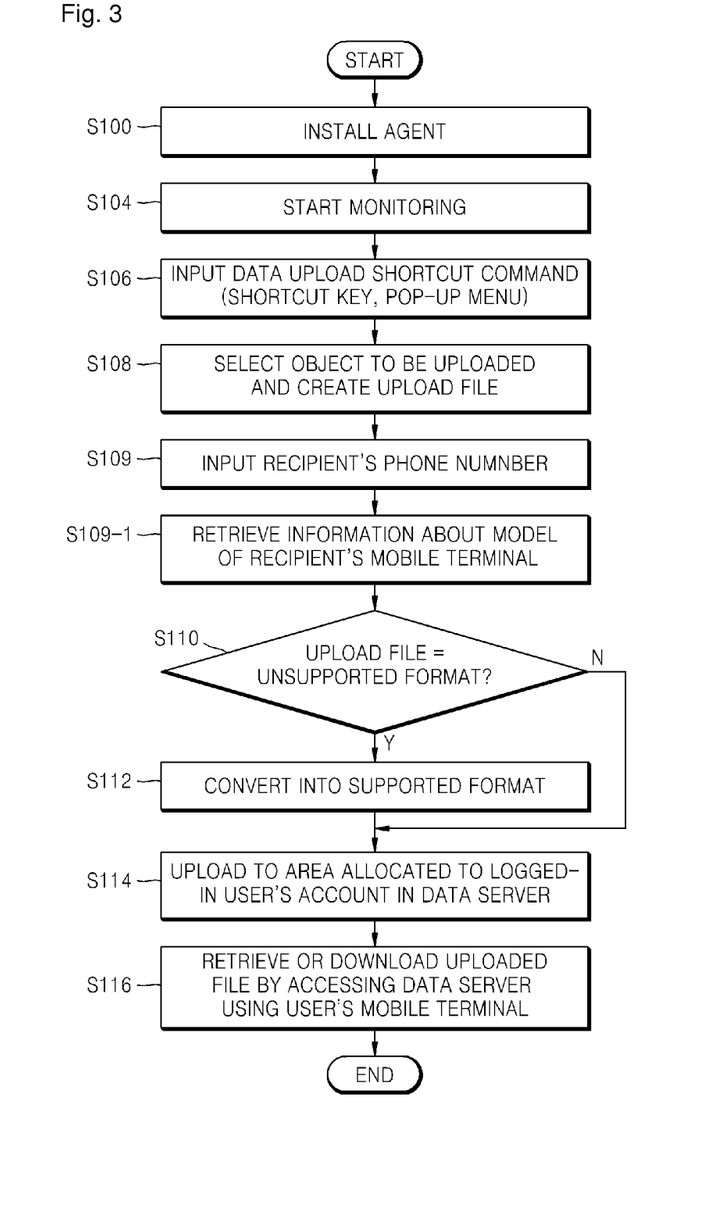
FIG. 3 is a flowchart illustrating a method of uploading data to a user-designated recipient's account according to an exemplary embodiment of the present invention.

FIG. 3 is a flowchart illustrating a method of uploading data by designating a recipient. The following description will focus on differences from FIG. 2.

In the current embodiment, sensing the input of a data upload shortcut command (operation S106) denotes sensing the selection of an 'upload to Friend's Account' item 402 from the pop-up menu shown in FIG. 4 or sensing the input of a shortcut key that is allocated to upload data to a user's account.

After operation S108 in which an object to be uploaded is selected and an upload file is created, a recipient of the upload file is designated.

A recipient may be designated by a phone number of the recipient's mobile terminal. (operation S109). In this case, an agent application may retrieve information about the model of the designated recipient's mobile terminal from a user information server of a mobile communication service provider by using the phone number of the designated recipient's mobile terminal.

When the information about the model of the designated recipient's mobile terminal is retrieved, formats unsupported by the model of the designated recipient's mobile terminal can also be identified. Thus, the agent application performs file conversion (operation S112) in the same process as that illustrated in FIG. 2 and uploads the upload file (operation S114).

The designated recipient may access the data server using his or her mobile terminal and retrieve or download the upload file uploaded to an area that is allocated to his or her account (operation S116).

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

INDUSTRIAL APPLICABILITY

This invention can be applied to the field of mobil software program.

The invention claimed is:

1. A data upload method used by a computer system, the method comprising:
    monitoring whether a data upload shortcut command is input, by an agent application which is executed in a background mode by an operating system that controls the computer system, wherein the monitoring by the agent application is performed by hooking an input occurrence message provided by the operating system;
    selecting an object displayed on a graphic user interface (GUI), which includes a selected block of text, to be uploaded when an input of the data upload shortcut command is sensed; and
    transmitting the selected object to a data server,
    wherein the selecting and transmitting are performed by the agent application when the data upload shortcut command is input by the user, and
    wherein the object is selected when the agent application receives an input for designating the block; on the GUI.

2. The method of claim 1, further comprising:
    receiving information about a first account through the agent application; and
    storing the upload file in an area corresponding to the first account in the data server after the transmitting of the upload file.

3. The method of claim 2, further comprising:
    receiving information about a second account from a user of a mobile terminal; and providing a list of files stored in the area, which corresponds to the first account, to the mobile terminal when the information about the first account is the same as the information about the second account or when the relationship between the first and second accounts allows the second account to access the first account.

4. The method of claim 3, further comprising:
requesting transmission of a file stored in the area, which corresponds to the first account, by using the mobile terminal; and
receiving the requested file by using the mobile terminal.

5. The method of claim 1, wherein the operating system supports the GUI, and the selecting of the object to be uploaded comprises selecting, when no activated object is available, an image object displayed at a position of a cursor on the GUI as the object to be uploaded.

6. The method of claim 5, wherein the transmitting of the upload file further comprises, when the activated object is character strings, creating the upload file in a text file format by using the character strings.

7. The method of claim 5, wherein the transmitting of the upload file further comprises:
generating a uniform resource locator (URL) information of the object to be uploaded by using an application programming interface (API) provided by an Internet browser application which posts a web document when the object to be uploaded is contents embedded in the web document; and
downloading a file which corresponds to the URL information,
wherein the upload file is the downloaded file.

8. The method of claim 5, wherein the transmitting of the upload file further comprises creating a content file, which contains the data of the object to be uploaded, by using an API provided by a document editing application when the object to be uploaded is contents embedded in a document posted on the document editing application, wherein the upload file is the content file.

9. The method of claim 1, further comprising receiving information about a model of the mobile terminal through the agent application, wherein the transmitting of the upload file comprises:
retrieving information about formats supported and unsupported by the model of the mobile terminal; and
converting the upload file into a supported format when the upload file is in an unsupported format and transmitting the upload file in the supported format to the data server.

10. The method of claim 9, wherein the receiving of the information about the model of the mobile terminal comprises:
receiving a phone number of the mobile terminal; and
retrieving the information about the model of the mobile terminal by using the phone number of the mobile terminal.

* * * * *